(No Model.)
C. E. HEISS.
PLUMBER'S TRAP.
No. 314,670. Patented Mar. 31, 1885.
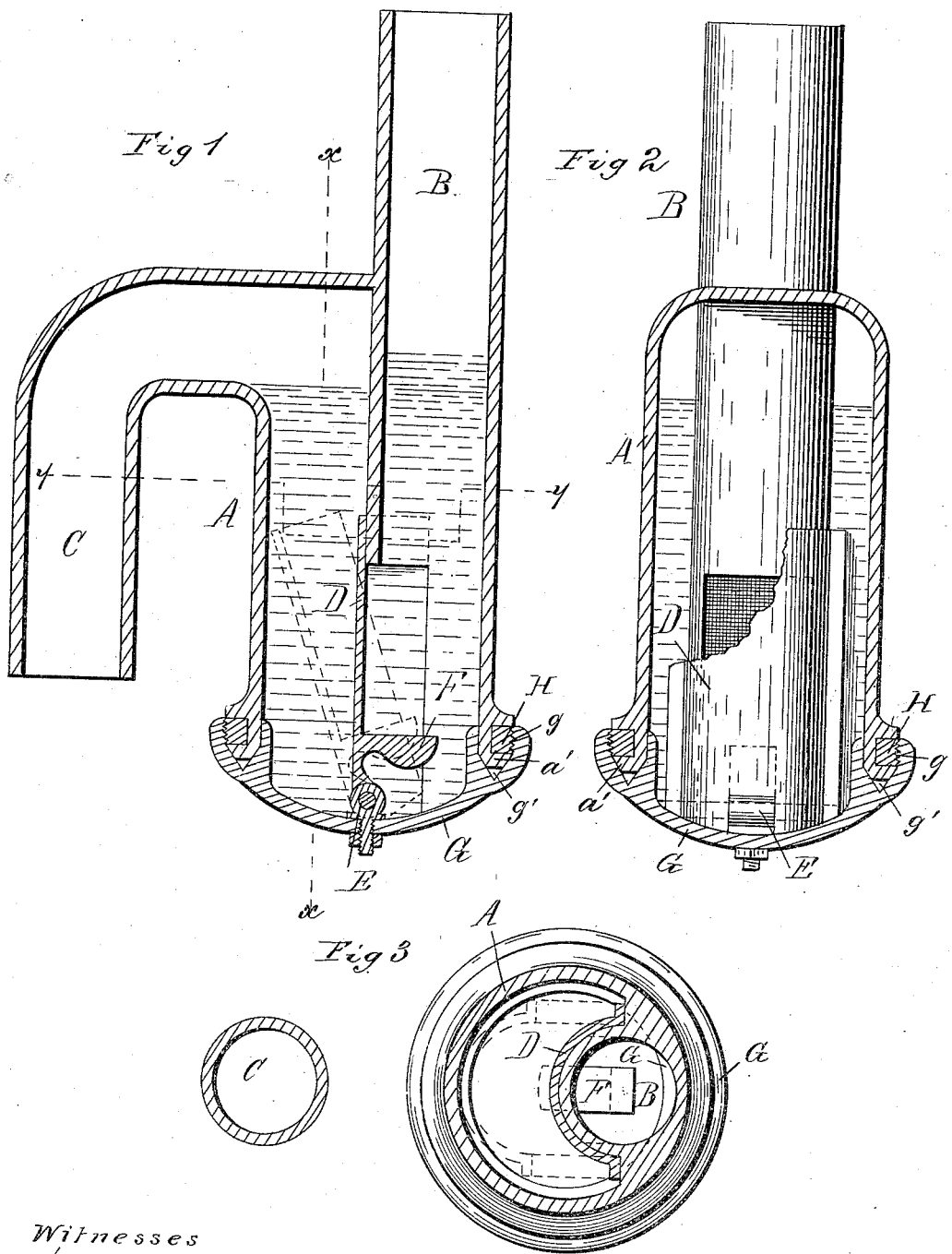
Witnesses
Inventor
Charles E. Heiss
By
Attorneys

UNITED STATES PATENT OFFICE.

CHARLES E. HEISS, OF CHICAGO, ILLINOIS, ASSIGNOR OF ONE-HALF TO JAMES N. RAYMOND, OF SAME PLACE.

PLUMBER'S TRAP.

SPECIFICATION forming part of Letters Patent No. 314,670, dated March 31, 1885.

Application filed February 28, 1884. (No model.)

*To all whom it may concern:*

Be it known that I, CHARLES E. HEISS, a citizen of the United States, and residing at Chicago, in the county of Cook and State of Illinois, have invented a certain new and useful Improvement in Plumbers' Traps, which is fully set forth in the following specification, reference being had to the accompanying drawings, in which—
Figure 1 represents a vertical section of a plumber's trap embodying my invention and taken though the inlet and outlet pipes; Fig. 2, a similar section of the same, taken on the line $x\ x$ of Fig. 1; and Fig. 3, a transverse section taken on the line $y\ y$ of Fig. 1.

Like letters refer to like parts in all the figures of the drawings.

My invention relates to the construction of plumbers' traps having cylindrical reservoirs, its object being to provide a trap which will be easy of clearance and effectual in operation, and also a durable and tight joint for the removable bottom of the trap.

I will proceed to describe in detail the construction and operation of my present invention, and will then point out more definitely in the claims the special improvements which I believe to be new and wish to protect by Letters Patent.
In the drawings, A represents the main body or reservoir portion of the trap, which is round or cylindrical in form, B the inlet-pipe thereto, and C the outlet or discharge pipe. The inlet-pipe B extends down into the interior of the cylindrical reservoir A, at one side thereof, to about the usual extent, leaving a large clearance or space between it and the opposite side of the reservoir, through which the water will readily pass without clogging.

In order to close the inlet-pipe at its bottom I employ a valve consisting of a curved plate, D, constructed substantially as shown, and hinged to the bottom of the trap at E, at or near its center. This plate extends upward so as to overlap the lower end of the inlet-pipe B, as shown, being weighted at F, so as to retain it in such a position as to normally close the space around the end of the inlet-pipe at the lower portion of the reservoir, and to be opened for clearance whenever the pressure from above is sufficient to overcome the weight which acts to keep it in place against the end of the inlet-pipe. It will be observed that in this construction the whole valve is attached to and removable along with the bottom of the trap, so that it may readily be inspected, cleaned, and repaired. The bottom G of the trap is made detachable by being provided with an internal screw-thread, $g$, and on the outside of the lower ends of the reservoir is arranged a ring, H, of suitable metal, which is also threaded and adapted to receive the threaded section of the bottom, thereby providing a tight screw-joint for the bottom and at the same time making it readily removable; but this common screw-thread joint is not tight enough for safety to prevent the escape of liquids and gases from the trap. I therefore provide an additional protection in the way of a seal for this portion of the trap. The edge of the bottom G is enlarged or thickened all around, and in its upper or outer surface is formed a groove, $g'$, which is preferably V-shaped, as shown in the drawings. The lower edge, $a'$, of the reservoir is beveled so as to fit this groove, as shown in the drawings, but not to extend quite to the bottom thereof, and in the bottom of the groove I place a liquid, which is intended to fill the space between the bottom of the groove and the edge of the reservor-pipe. It will be seen at once that I thus make a liquid seal for this joint at the bottom of the reservoir, and the liquid placed in this joint should be such as is adapted to this use, glycerine being a very good liquid for this purpose, though I do not wish to be understood as limiting myself to it. Under this construction and arrangement I obtain a perfectly tight joint at the bottom of the reservoir, which is also very durable, and at the same time provides for a ready removal of the bottom whenever occasion may require. It will be understood, of course, that while the main portions of the trap are of lead the bottom of the screw-ring should be of some harder metal—such as brass, for instance.

Having thus described my invention, what I claim as new, and desire to secure by Letters Patent, is—

1. In a plumber's trap, a cylindrical reservoir, in combination with the inlet-pipe arranged within the same at one side thereof, and a weighted valve, F, pivoted to the bottom of the reservoir and arranged to close the inlet-pipe, substantially as and for the purposes specified.

2. In a plumber's trap, the combination, with the cylindrical reservoir A, and the inlet-pipe B, arranged therein at one side, of the detachable bottom G, and weighted valve F pivoted thereto, and extending upward to overlap the end of the inlet-pipe, substantially as and for the purposes specified.

3. In a plumber's trap, the reservoir, in combination with a detachable bottom fastened to the reservoir-body by screw-threads, and provided with a liquid seal at the joint between the reservoir-body and bottom, substantially as and for the purposes specified.

4. In a plumber's trap, the reservoir A, the bottom edge of which is beveled or wedge-shaped, in combination with the bottom G, provided with a threaded section, $g$, and a V-shaped groove, $g'$, and the threaded ring H, secured to the reservoir near the lower end thereof, substantially as and for the purposes specified.

CHARLES E. HEISS.

Witnesses:
THOMAS H. PEASE,
G. E. FAULKNER.